United States Patent
Shih et al.

(10) Patent No.: US 12,545,629 B1
(45) Date of Patent: Feb. 10, 2026

(54) FUNCTIONAL TAILORING OF OXIDATION PROTECTION SYSTEMS OF CARBON-CARBON COMPOSITES

(71) Applicant: LOCKHEED MARTIN CORPORATION, Bethesda, MD (US)

(72) Inventors: Wei Shih, Yorba Linda, CA (US); Witold Kowbel, Tucson, AZ (US)

(73) Assignee: Lockheed Martin Corporation, Bethesda, MD (US)

( * ) Notice: Subject to any disclaimer, the term of this patent is extended or adjusted under 35 U.S.C. 154(b) by 903 days.

(21) Appl. No.: 16/749,889

(22) Filed: Jan. 22, 2020

Related U.S. Application Data (60) Provisional application No. 62/918,247, filed on Jan. 23, 2019.

(51) Int. Cl.
  *B32B 9/00* (2006.01)
  *C04B 35/83* (2006.01)
  (Continued)

(52) U.S. Cl.
  CPC ............ *C04B 35/83* (2013.01); *C04B 41/009* (2013.01); *C04B 41/4531* (2013.01); *C04B 41/4539* (2013.01); *C04B 41/4556* (2013.01); *C04B 41/48* (2013.01); *C04B 41/5001* (2013.01); *C04B 41/5057* (2013.01); *C04B 41/5059* (2013.01); *C04B 41/5133* (2013.01); *C04B 41/522* (2013.01); *C04B 2235/3826* (2013.01);
  (Continued)

(58) Field of Classification Search
  CPC ...... Y10T 428/30; B82Y 30/00; C01B 32/158
  USPC .......................................................... 428/408
  See application file for complete search history.

(56) References Cited

U.S. PATENT DOCUMENTS

| 3,936,574 A | 2/1976 | Martin |
| 6,455,159 B1 | 9/2002 | Walker et al. |

(Continued)

FOREIGN PATENT DOCUMENTS

WO   WO 2005102962 A1 * 11/2005 ............. B82Y 30/00

OTHER PUBLICATIONS

Mckee, D.W., "Borate Treatment of Carbon Fibers and Carbon/Carbon Composites for Improved Oxidation Resistance," Carbon, Pergamon Journals Ltd., 1986, vol. 24, No. 6, pp. 731-741.

(Continued)

*Primary Examiner* — Daniel H Miller
(74) *Attorney, Agent, or Firm* — Baker Botts L.L.P.

(57) ABSTRACT

This disclosure provides an oxidation-resistant carbon-carbon composite that is molecularly inhibited with uniformly dispersed carbides. Nanoparticles of refractory metals and/or semi-metals suspended in a colloidal suspension infiltrate pores of a carbon-carbon composite during an initial pre-impregnation stage or carbon densification stage. The carbon-carbon composite is heated to form carbides that provide molecular level inhibition in both the interbundle and intrabundle matrix. The carbides are configured to form glass that serves as an oxidation barrier for the carbon-carbon composite. The carbon-carbon composite may be coated with external coatings that can include a converted silicon carbide, functionally graded material (FGM) ceramic coating, metallic coating, polymer-based coating, as-cured or low-temperature heat-treated sealant, or combinations thereof.

17 Claims, 6 Drawing Sheets

(51) Int. Cl.
  *C04B 41/00* (2006.01)
  *C04B 41/45* (2006.01)
  *C04B 41/48* (2006.01)
  *C04B 41/50* (2006.01)
  *C04B 41/51* (2006.01)
  *C04B 41/52* (2006.01)
(52) U.S. Cl.
  CPC ............... *C04B 2235/3839* (2013.01); *C04B 2235/422* (2013.01); *C04B 2235/5248* (2013.01)

(56) References Cited

U.S. PATENT DOCUMENTS

| | | |
|---|---|---|
| 6,668,984 B2 | 12/2003 | Gray |
| 2003/0138672 A1* | 7/2003 | Bauer ................ C04B 41/52 428/704 |
| 2007/0026153 A1* | 2/2007 | Nicolaus .............. C04B 35/83 427/430.1 |
| 2008/0145293 A1* | 6/2008 | Carberry .............. C04B 35/565 423/276 |

OTHER PUBLICATIONS

Ehrburger, P., et al. "Inhibition of the Oxidation of Carbon-Carbon Composite by Boron Oxide," Carbon, Pergamon Journals Ltd., 2186, vol. 24, No. 4, pp. 495-499.

Jones, L.E. et al., "Influence of Boron on Carbon Fiber Microstructure, Physical Properties, and Oxidation Behavior," Carbon, Pergamon Press Plc., 1991, vol. 29. No. 2, pp. 251-269.

Yoo, Seoung-Eun, et al., "Effect of $MoO_3$ on Mechanical Interfacial Behavior and Anti-Oxidation of Carbon Fibers-Reinforced Composites," Journal of Industrial and Engineering Chemistry, vol. 20, 2015, pp. 29-32.

Lin, N., et al., "Pack Boronizing of P110 Oil Casing Tube Steel to Combat Wear and Corrosion," Int. J. Electrochem. Sci., vol. 10, 2015, pp. 2694-2706.

Kowbel, W., et al., "CVD and CVR Silicon-Based Functionally Gradient Coatings on C-C Composites," Carbon, 1995, vol. 33, No. 4, pp. 415-426.

Hoffman, W.P., et al., "The Deposition of Silica on Carbon as a Model System for Oxidation Protection Coatings," Carbon, vol. 33, No. 4, 1995, pp. 509-524.

Tsou, H.T., et al., "A Hybrid PACVD SiC/CVD $Si_3N_4$/SiC Multilayer Coating for Oxidation Protection of Composites," Carbon, 1995, vol. 33., No. 9, pp. 1279-1288.

Kowbel, W., "The Mechanism of Oxidation Protection of C/C Composites Coated with Graded-Codeposited Carbides and Nitrides," Functionally Gradient Materials, Ceramic Transaction, vol. 34, 1992, pp. 237-244.

Kowbel, W., et al., "Oxidation Protection of C/C Composites by Graded-Codeposited CVD Coatings," AD—vol. 25-1, Damage and Oxidation Protection in High Temperature Composites—vol. 1, ASME, 1991, pp. 65-76.

Kowbel, M., et al., "Strengthening and Toughening Mechanisms in SiC/C CVD Composites," AD—vol. 25-1, Damage and Oxidation Protection in High Temperature Composites—vol. 1, ASME, 1991, pp. 93-100.

Savage, G., "Carbon-Carbon Composites: the Properties of Carbon-carbon Composition," First Edition 1993, at pp. 277-322.

Krenkel, W., "Carbon/Carbons and Their Industrial Applications," Ceramic Matrix Composites, 2008, pp. 69-92.

Ohlhorst, C. W., "Development of X-43A Mach 10 Leading Edges," IAC-05-D2.5.06, pp. 1-9.

Dhami, T.L., et al., "Oxidation-Resistant Carbon-Carbon Composites up to 1700° C.," Carbon, vol. 33, No. 4., 1995, pp. 479-490.

Sheehan, J. E., "High-Temperature Coatings on Carbon Fibers and Carbon-Carbon Composites," Chapter 8, pp. 223-266.

\* cited by examiner

FUNCTIONAL TAILORING OF OXIDATION PROTECTION SYSTEMS OF CARBON-CARBON COMPOSITES

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

This disclosure relates to carbon-carbon composites, and more particularly to oxidation protection systems for carbon-carbon composites.

BACKGROUND

Carbon fibers are one of the strongest and stiffest known fibers. The strong covalent bonds of carbon are responsible for the strength and stiffness of carbon fibers, and their mechanical properties are retained at high temperatures. Carbon fibers provide excellent structural properties with very low density. Carbon fibers exhibit tremendous potential in reinforcing composites for vastly improved properties.

Carbon fiber-carbon matrix composites include carbon fibers embedded in a carbon matrix, which is better known as carbon-carbon composites. Carbon-carbon composites are lightweight, very-high-temperature materials with superior thermal shock, toughness, and ablation properties. Carbon-carbon composites retain their properties above 2000° C. The properties of carbon-carbon composites have resulted in exploitation in aerospace and military applications such as rocket nozzles, heat shields, reentry vehicle nose-tips, and aircraft brakes. Future hypersonic missiles and hypersonic vehicles may employ the use of carbon-carbon composites due to their unique characteristics of increasing strength with increasing temperatures.

Carbon is susceptible to oxidation at elevated temperatures. This is due to oxides of carbon being gaseous and therefore, are not protective. Specifically, carbon-carbon composites can suffer from rapid oxidation above about 550° C. depending on their degree of graphitization, purity, and internal characteristics such as open porosity. As many flight-related applications for high-temperature materials involve air-breathing components or structures that must withstand aerodynamic heating, effective oxidation protection is imperative for carbon-carbon composites in many aircraft and aerospace applications. Attempts are being made to develop carbon-carbon composites that can be used for high-temperature structural applications in oxidizing environments. Some of the strategies employed in oxidation protection systems for carbon-carbon composites include internal oxidation protection, external coatings, and external sealants.

SUMMARY

The systems, methods and devices of this disclosure each have several innovative aspects, no single one of which is solely responsible for the desirable attributes disclosed herein.

One innovative aspect of the subject matter described in this disclosure can be implemented in an oxidation-resistant carbon-carbon composite. The oxidation-resistant carbon-carbon composite includes carbon fibers in a carbon matrix having an intrabundle matrix region and an interbundle matrix region. The oxidation-resistant carbon-carbon composite further includes in-situ carbides of refractory metals and/or semi-metals configured to form glass upon oxidation. The carbon-carbon composite is molecularly inhibited with the in-situ carbides in both the intrabundle matrix region and the interbundle matrix region.

In some implementations, the in-situ carbides include hafnium carbide, zirconium carbide, titanium carbide, tantalum carbide, silicon carbide, boron carbide, or combinations thereof. In some implementations, the oxidation-resistant carbon-carbon composite is configured to withstand an elevated temperature in a temperature range of 2000° F. to 4200° F. without mass loss exceeding more than 1%. In some implementations, the in-situ carbides are distributed uniformly throughout the carbon-carbon composite. In some implementations, the in-situ carbides are formed from: (i) infiltrating pores of the carbon-carbon composite with a colloidal suspension, the colloidal suspension including nanoparticles of refractory metals or semi-metals suspended in a solution, and (ii) heating the carbon-carbon composite to cause the nanoparticles to react with surfaces of the carbon fibers and/or carbon matrix to form in-situ carbides. In some implementations, the nanoparticles each have a diameter equal to or less than about 50 nm. In some implementations, the colloidal suspension is formed from mixing isopropyl alcohol (IPA) with hydrolyzed halides of the refractory metals or semi-metals. In some implementations, heating the carbon-carbon composite occurs at a temperature between about 750° C. and about 3000° C. In some implementations, infiltrating the pores of the carbon-carbon composite with the colloidal suspension occurs at an initial pre-impregnation stage and/or at a carbon densification stage. In some implementations, the carbon-carbon composite further includes a layer of silicon carbide (SiC), wherein the layer of SiC is converted by chemical vapor reaction (CVR) at an external surface of the carbon-carbon composite. In some implementations, the carbon-carbon composite further includes an external coating comprising a functionally graded material (FGM) ceramic coating over the layer of SiC, the FGM ceramic coating including compositionally graded C—SiC, BN—$Si_3N_4$, or $B_4C$—SiC, the FGM ceramic coating having a thickness equal to or less than about 600 microns. In some implementations, the FGM ceramic coating includes at least a stack composed of FGM C-carbide I/carbide I/FGM carbide I-carbide II/carbide II/FGM carbide II-carbide I/carbide I, where carbide I is selected from a group consisting of: silicon carbide and boron carbide, and where carbide II is selected from a group consisting of: hafnium carbide, tantalum carbide, titanium carbide, zirconium carbide, and silicon carbide. In some implementations, the carbon-carbon composite further includes a metallic coating over the layer of SiC, and an FGM ceramic coating over the metallic coating. In some implementations, the carbon-carbon composite further includes a polymer-based coating over the layer of SiC, where the polymer-based coating includes a plurality of polymer-impregnated layers each having one or more particulates of a refractory metal or semi-metal powder. In some implementations, the carbon-carbon composite further includes an FGM ceramic coating over the layer of SiC, and an as-cured polymer sealant or low-temperature heat-treated sealant over the FGM ceramic coating.

Another innovative aspect of the subject matter described in this disclosure can be implemented in a method of protecting a carbon-carbon composite against oxidation. The method includes infiltrating a carbon-carbon composite with a colloidal suspension, the colloidal suspension including nanoparticles of refractory metals and/or semi-metals suspended in a solution, and heating the carbon-carbon composite to cause the nanoparticles to react with surfaces of carbon fibers and/or carbon matrix to form carbides of the refractory metals and/or semi-metals, thereby molecularly inhibiting the carbon-carbon composite in an interbundle matrix region and intrabundle matrix region of the carbon-carbon composite.

In some implementations, the nanoparticles of the refractory metals and/or semi-metals include hafnium, zirconium, titanium, tantalum, silicon, boron, or combinations thereof. In some implementations, the nanoparticles each have a diameter equal to or less than about 50 nm. In some implementations, heating the carbon-carbon composite occurs at a temperature between about 750° C. and about 3000° C. In some implementations, at least infiltrating the carbon-carbon composite with the colloidal suspension occurs at an initial pre-impregnation stage and/or at a carbon densification stage. In some implementations, the carbides of the refractory metals and/or semi-metals are configured to form glass upon oxidation. In some implementations, the method further includes infiltrating the carbon-carbon composite with colloidal Si/Hf solution over the converted silicon carbide.

BRIEF DESCRIPTION OF THE DRAWINGS

Like reference numbers and designations in the various drawings indicate like elements.

DETAILED DESCRIPTION

Many applications of carbon-carbon composites, including carbon-carbon composites in brake discs and hypersonic vehicles, will expose the carbon-carbon composites to very high temperatures and oxygen contact. When carbon is exposed to oxygen, it oxidizes and burns at temperatures as low as 550° C. depending on the graphitization, purity, and internal characteristics of the carbon-carbon composite. As a result, any structure formed of carbon-carbon composite melts and disintegrates. Carbon-carbon composites are oxidized according to the following chemical reactions: $C_{(s)} + O_{2(g)} \rightarrow CO_{2(g)}$ and $2C_{(s)} + O_{2(g)} \rightarrow 2CO_{(g)}$. These reactions may be controlled by various factors such as temperature and oxygen flow rate. If the carbon-carbon composite is subjected to high temperatures and large airflows without oxidation protection, the result can be catastrophic. Any oxidation protection system for a carbon-carbon composite should be able to withstand temperatures greater than about 2000° F. (i.e., greater than 1093° C.) and protect the carbon-carbon composite against oxidation for multi-cycle and single-cycle applications.

Some of the approaches for oxidation protection of carbon-carbon composites include internal oxidation protection, external coatings, and external sealants. These approaches may block active sites, stifle the rate of oxidation, and/or prevent oxygen from moving inwards while keeping carbon from moving out. Each of these approaches are described in turn.

One aspect of internal oxidation protection can involve purification of the carbon matrix. Oxidation of carbon may increase with the presence of catalytic impurities in the carbon matrix. Examples of catalytic impurities include metal elements such as iron (Fe), manganese (Mn), nickel (Ni), and cobalt (Co), among others. Purification of carbon-carbon composites by removal of catalytic impurities from the carbon matrix may enhance resistance to oxidation. For instance, the carbon matrix may be purified in a halogen atmosphere to remove catalytic impurities. This can significantly decrease oxidation rates at low temperatures.

Another aspect of internal oxidation protection can involve optimized microstructures. Graphitized carbon generally exhibits better resistance to oxidation in air. This can be explained by the fact that graphitization treatment at high temperature can decrease the active sites of the carbon surface available to react with oxygen. Increased graphitization can occur by converting amorphous carbon into graphite in the carbon matrix. Increased matrix graphitization can retard low temperature oxidation.

A further aspect of internal oxidation protection can relate to impregnation by inorganic salts. The inorganic salts may be phosphate-based salts. Open pores in a carbon-carbon composite may permit impregnation with a resin, inorganic salt, molten metal, or other material. The inorganic salts may penetrate the carbon-carbon composite and block off active sites by contaminations applied as salt impregnations. This technique is commonly applied in brake applications and is often used after fully densifying the carbon-carbon composite.

Yet a further aspect of internal oxidation protection may involve matrix additives. Chemical modifications can be made to the carbon matrix by either adding elements or compounds as a powder to the resin or pitch matrix precursor. For example, a resin can be mixed with different powders at a pre-impregnation (pre-preg) stage. Chemical modifications are most effective and produce coherent coatings when a low viscosity, wetting glass is formed initially or when exposed to oxygen. A localized region of glass can be formed by the oxidation of powders that were added to the matrix of the carbon-carbon composite. The glass may be produced near the surface of the composite because of oxygen permeation through a crack in an external coating. Glass that originates in the composite below the external coating can also migrate to fill coefficient of thermal expansion (CTE) mismatch cracks in the coating. By way of an example, boron (B), zirconium (Zr), or hafnium (Hf) particulates may be added to a phenolic resin. Borate glass, zirconia glass, or hafnia glass may be formed when the particulates react with oxygen to provide localized inhibition in the carbon matrix.

Still yet a further aspect of internal oxidation protection may involve silicon treatment. Silicon infiltrates the carbon matrix to react with carbon and form silicon carbide (SiC). The higher the amount of silicon carbide, the better the oxidation resistance. However, increasing the degree of conversion to silicon carbide in the matrix can result in increasing brittleness and fiber damage. There are many different techniques such as silicon treatments with silicon vapor, by melt impregnation under vacuum and pressure, by capillary impregnation via liquid phase reaction, by pack cementation, or by a combination of cementation and liquid phase impregnation. Silicon treatment is common in brake and other applications.

Turning to external coatings, one aspect of external coatings in oxidation protection may involve single layer chemical vapor deposition (CVD) ceramic coatings. For example, a coating of silicon carbide is formed on an external surface of the carbon-carbon composite by CVD. Silicon carbide forms silica in oxidizing atmospheres, and silica has a low diffusion rate of oxygen. This enhances oxidation protection. However, due to CTE mismatch, this coating can suffer from severe cracking during cool down from a CVD deposition temperature. In an alternative example, a coating of silica is formed on an external surface of the carbon-carbon composite by CVD.

Another aspect of external coatings in oxidation protection may relate to single layer plasma-assisted chemical vapor deposition (PACVD) ceramic coatings. For example, a coating of silicon carbide is formed on an external surface of the carbon-carbon composite by PACVD. This enhances oxidation protection while reducing thermal cracking problems normally associated with CVD silicon carbide. However, the PACVD coating may result in some growth cracks that do not close at higher temperatures, resulting in some oxidation in the carbon-carbon composite.

A further aspect of external coatings in oxidation protection can relate to multilayer CVD ceramic coatings. For example, a single layer silicon carbide coating can be formed on an external surface of the carbon-carbon composite by CVD followed by a multilayer silicon carbide/boron carbide formed by CVD. Oxidation of boron carbide yields borate glass ($B_2O_3$) while silicon carbide yields silica glass ($SiO_2$), and their mixture forms borosilicate glass which can fill up cracks in the silicon carbide coating at temperatures below the CVD deposition temperature.

Yet a further aspect of external coatings in oxidation protection can involve multilayer PACVD ceramic coatings. For example, a multilayer coating of silicon carbide/silicon nitride can be formed on an external surface of the carbon-carbon composite by CVD. By having an inner coating of silicon carbide and an outer coating of silicon nitride, the carbon-carbon composite exhibits improved oxidation resistance compared to single layer PACVD silicon carbide.

Still yet a further aspect of external coatings in oxidation protection may involve functionally graded material (FGM) ceramic coatings by CVD. FGMs consist of two or more materials having a continuously varying spatial composition profile. FGM ceramic coatings may exhibit superior properties over traditional composite materials. For instance, FGM ceramic coatings may enhance bond strength, reduce thermal stress, and reduce crack driving force. An example of an FGM ceramic coating deposited by CVD is carbon-silicon carbide (C—SiC), where the bottom layer is carbon and the top layer is silicon carbide so that the composition varies from carbon to silicon carbide. With C—SiC, crystallites of carbon can be oriented parallel to the substrate while silicon carbide grains can be equiaxed, spherical in shape and dispersed in a carbon matrix. Another example of an FGM ceramic coating deposited by CVD is boron nitride-silicon nitride (BN—$Si_3N_4$), where the bottom layer is boron nitride and the top layer is silicon nitride so that the composition varies from boron nitride to silicon nitride. With BN—$Si_3N_4$, all the grains can be equiaxed, spherical in shape. Yet another example of an FGM ceramic coating deposited by CVD is boron carbide-silicon carbide ($B_4C$—SiC), where the bottom layer is boron carbide and the top layer is silicon carbide so that the composition varies from boron carbide to silicon carbide. With $B_4C$—SiC, all the grains can be equiaxed, spherical in shape. FGM ceramic coatings typically have thicknesses of less than about 100 microns, as thicker coatings usually result in stress-related growth cracks. FGM ceramic coatings exhibited improved oxidation resistance and limited thermally induced cracking.

Still yet a further aspect of external coatings in oxidation protection may involve metallic coatings. Metals such as iridium, rhenium, or platinum may be formed on an external surface of the carbon-carbon composite by various deposition methods such as CVD. Iridium serves as an excellent barrier to oxygen and carbon while not reacting with carbon to form carbides. However, at very high temperatures, iridium is susceptible to forming volatile oxides.

Turning to external sealants, one aspect of external sealants can involve glass sealants formed on external coatings or surfaces. For example, when a layer of silicon carbide is formed on an external surface of the carbon-carbon composite, in-situ silica glass may form as a glaze when the silicon carbide is exposed to oxygen. The layer of silicon carbide may have more significant doping of silicon to promote the reaction between silicon and oxygen. In alternative examples, refractory oxides such as zirconia, hafnia, or yttria may form upon exposure to oxygen to form a glass sealant. Moreover, boron oxide sealants may form in cracks in silicon-based coatings. However, the thermal shock resistance of glass sealants may be poor.

Conventional oxidation protection systems of carbon-carbon composites are largely inadequate to protect carbon-carbon composites in a number of applications. Some of the issues are discussed above. Additional problems may include erosion and coating spallation. Further problems may include inadequate protection due to thermally induced cracks, instability of coating and resulting glass at high temperatures, poor coating adhesion to the carbon-carbon substrate, and lack of robust oxidation resistance of the carbon-carbon substrate.

The present disclosure provides an improved oxidation protection system for a carbon-carbon composite. Rather than providing oxidation inhibition at a particulate level that is unable to infiltrate fiber bundles and small pores, the oxidation protection system of the present disclosure provides oxidation inhibition at a molecular level that is able to infiltrate the interbundle and intrabundle matrix of the carbon-carbon composite. Nanoparticles of refractory metals and/or semi-metals suspended in a colloidal suspension infiltrate pores of a carbon-carbon composite during an initial pre-impregnation stage and/or carbon densification stage. The carbon-carbon composite is heated to form in-situ carbides that provide molecular level inhibition in the interbundle and intrabundle matrix. In addition, the carbon-carbon composite may be coated with external coatings that can include a converted silicon carbide undercoating, functionally graded material (FGM) ceramic coating, metallic coating, polymer-based coating, as-cured or low-temperature heat-treated sealant, or combinations thereof. The oxidation protection system of the carbon-carbon composite is able to withstand an elevated temperature in a temperature range of 2000° F. to 4200° F. without mass loss exceeding more than 1% in multi-cycle and single-cycle applications.

As discussed above, internal oxidation protection of carbon-carbon composites may occur by matrix additives of particulates or powders. Ordinarily, a resin is mixed with particulates of boron, zirconium, or hafnium at a pre-impregnation stage. An average size of such particulates is typically on the order of several microns or hundreds of nanometers. Furthermore, the addition of such particulates greatly increases the viscosity of the resin. Given that carbon-carbon composites have many small pores and small-diameter fibers, given the large size of the particulates in the matrix, and given the greatly increased viscosity of the matrix mixed with particulates, effective addition of particulates into fiber bundle and small pores is prevented or otherwise limited. As a result, the particulates in the matrix can provide only localized inhibition in the matrix, since powders will generally not form inhibition at the molecular level but are primarily confined to only interbundle matrix regions providing virtually no fiber protection during composite oxidation. Liquid precursors and liquid penetrants for oxidation inhibition also suffer from the same limitations as particulates mixed in the matrix. Liquid precursors and liquid penetrants employ micron-size sintered particles. The large-size sintered particles disperse only locally within the interbundle matrix regions and do not provide molecular level inhibition.

Figure 1A:
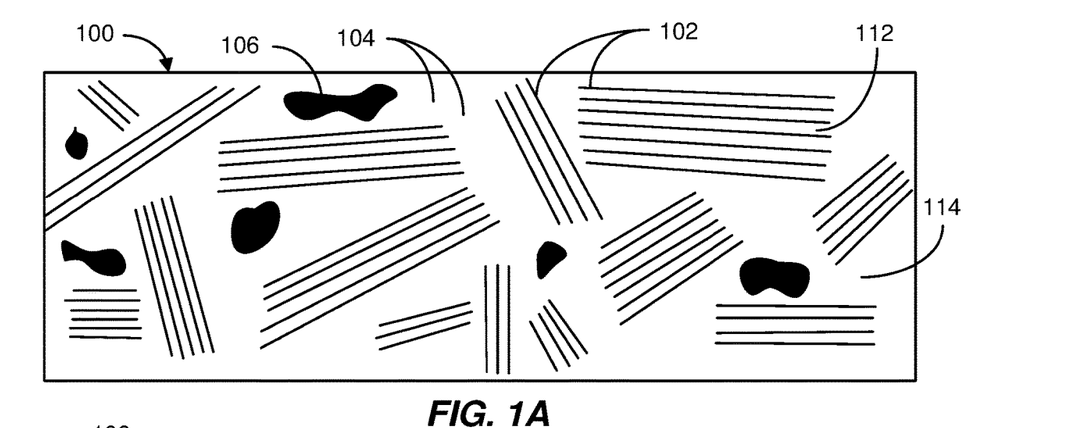
FIG. 1A shows a schematic representation of an example microstructure of a carbon-carbon composite.

FIG. 1A shows a schematic representation of an example microstructure of a carbon-carbon composite. A carbon-carbon composite 100 includes carbon fibers 102 in a carbon matrix 104. Carbon fibers 102 are filaments of non-graphitic carbon produced by the carbonization of synthetic or natural organic fibers or of fibers spun from organic precursors such as resins and pitches. In some implementations, the carbon fibers 102 can be based on pitch, polyacrylonitrile (PAN), or rayon-based carbon fiber. In some implementations, the carbon fibers have diameters on the order of a few microns to several microns, e.g., between about 3 microns and about 10 microns. A few thousand to several thousand carbon fibers 102 may be bundled/woven together to form a tow. Carbon fibers 102 may be classified according to their elastic moduli, which can correlate with the degree of alignment. Examples of basic classifications include low, intermediate, high, and ultrahigh modulus. Carbon fibers 102 are generally available in a number of yarns and tows with different moduli, strengths, cross-sectional areas and shapes, twists, and number of fiber ends. This can influence the mechanical properties of the carbon-carbon composite 100. The carbon fibers 102 may be configured and consolidated into various preforms or useful shapes. In some implementations, the fiber architecture of the carbon fibers 102 may be arranged in 1-D carbon preforms, 2-D carbon preforms, 2.5-D carbon preforms, or 3-D carbon preforms. Generally, resistance to oxidation in the 350° C. to 450° C. range can be improved by controlling the impurities that catalyze oxidation and by stabilizing the carbon fibers 102 with higher temperature heat treatments during processing. Higher heat treatments produce denser and more highly aligned fibers with less active surfaces.

The carbon matrix 104 serves to transfer the mechanical loads to the reinforcing carbon fibers 102, where the carbon matrix 104 contributes to the physical and chemical properties of the carbon-carbon composite 100. The carbon matrix 104 may be graphite. Example matrix systems used in the manufacture of the carbon-carbon composite 100 can include thermosetting resins, thermoplastic precursors, and gas phase derived carbons or ceramics. It is generally desirable that the carbon matrix 104 have a high carbon yield to obtain a completely densified carbon-carbon composite 100.

The carbon-carbon composite 100 is formed by gradually building up the carbon matrix 104 on a fiber preform through a series of steps of impregnation, pyrolysis, and/or chemical vapor deposition. By way of an example, manufacture of the carbon-carbon composite 100 can involve at least some of the following operations: (i) pre-impregnation, (ii) lay-up, (iii) cure, (iv) carbonization, (v) heat treatment (e.g., densification). Woven carbon fibers may be provided as a cloth in a carbon preform (e.g., 2-D, 3-D, etc.). From the initial pre-impregnation (pre-preg) stage, matrix material is already present in carbon fibers, which can allow for the carbon fibers to be bonded together and for easy handling. Laying up sheets of a pre-preg cloth builds up to a desired thickness, and the sheets are pasted together with a binder to form a lay-up. The lay-up can be cured to graphitize the binder at an elevated temperature, thereby forming the carbon matrix 104 for graphite-reinforced carbon fibers 102. However, the carbon matrix 104 may have numerous voids inside. Carbonization and densification involve repeated impregnation with pitch or resin with high temperature treatments for graphitization of the carbon matrix 104. This reduces the size and number of voids in the carbon matrix 104. Heat treatment at high temperatures may densify the carbon-carbon composite 100 by pyrolysis of the pitch or resin into carbon. Densification may also be accomplished by CVD.

The carbon matrix 104 may have a number of voids or pores 106. The pores 106 may be a result of shrinkage of the binder during graphitization. The size and number of pores 106 may be reduced during carbonization and densification of the carbon-carbon composite. The porosity of the carbon-carbon composite 100 may affect the diffusion and infiltration of precursors (gaseous or liquid) through the carbon-carbon composite 100. In some implementations, the carbon-carbon composite 100 has a porosity between about 80% and about 10%, or between about 70% and about 15%. During densification, open porosity can be reduced. In some implementations, open porosity of the carbon-carbon composite 100 can be equal to or greater than about 25% prior to densification. After densification, the open porosity of the carbon-carbon composite 100 can be equal to or less than about 15%. In some implementations, the carbon-carbon composite 100 of the present disclosure can be designed with nanoporosity or microporosity, where the pores 106 are on a scale of nanometers to a few microns.

The carbon matrix 104 of the carbon-carbon composite 100 may include an intrabundle matrix region 112 and an interbundle matrix region 114. The intrabundle matrix region 112 describes spaces within a bundle of carbon fibers 102, including the spaces between filaments in a bundle of carbon fibers 102, where the spaces can include matrix material, voids, and pores. The interbundle matrix region 114 describes spaces that separate between bundles of carbon fibers 102, where the spaces can include matrix material, voids, and pores.

Figure 1B:
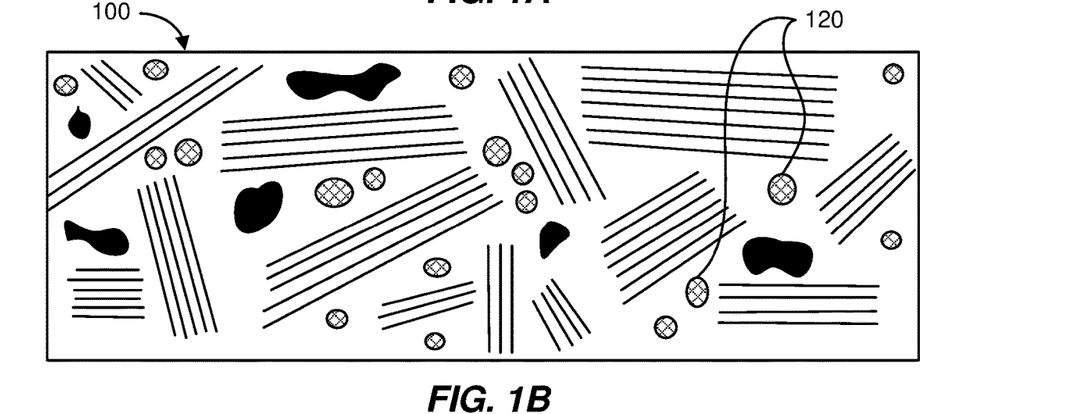
FIG. 1B shows a schematic representation of an example microstructure of a carbon-carbon composite with particulate level inhibition.

FIG. 1B shows a schematic representation of an example microstructure of a carbon-carbon composite with particulate level inhibition. During the pre-impregnation stage, particulates 120 of boron, zirconium, or hafnium are mixed with a resin, and carbon fibers woven in a cloth are coated with the resin. The particulates 120 of boron, zirconium, or hafnium are configured to form glasses at high temperatures when exposed to oxygen. The particulates 120 may be in a powder form. After carbonization and/or densification, the particulates 120 are generally too large for the pores 106 of the carbon-carbon composite 100. Otherwise, the particulates 120 may plug up the pores 106. The particulates 120 are generally too large for penetrating and infiltrating the intrabundle matrix region 112. As a result, the particulates 120 remain localized and confined to the interbundle matrix region 114. This leads to non-uniform distribution of the particulates 120 in the carbon-carbon composite 100 for oxidation inhibition, thereby leaving many parts of the carbon-carbon composite 100 vulnerable to oxidation.

In the present disclosure, internal oxidation protection is achieved by molecular level inhibition. Rather than using fine powders or particulates as matrix additives, the present disclosure involves a colloidal suspension of nanoparticles. As used herein, a "nanoparticle" has a size equal to or less than about 50 nm in diameter. The nanoparticles may include an elemental refractory metal (e.g., titanium, hafnium, or zirconium) and/or semi-metal (e.g., boron or silicon). For instance, the nanoparticles may include only silicon, only boron, a mixture of silicon and hafnium, or a mixture of silicon and zirconium. The nanoparticles are mixed with a solvent that produces a stable colloidal suspension without agglomeration and without dissolution. The nanoparticles in the stable colloidal suspension do not result in greatly increased viscosity.

Mixing nano-powders of hafnium or silicon in a solvent typically results in agglomeration, thereby resulting in a nonstable suspension that is unable to infiltrate between fibers and intrabundle matrix regions. In some instances, mixing nano-powders of hafnium or silicon greatly increases viscosity.

In contrast, hydrolysis of halides has surprisingly achieved steric stabilization of the colloidal suspension. That way, the nanoparticles do not agglomerate or greatly increase viscosity in the colloidal suspension. The colloidal suspension may be formed by introducing halides of the refractory metals or semi-metals in a solvent. Examples of such halides of refractory metals or semi-metals include, for example, silicon tetrachloride ($SiCl_4$), titanium tetrachloride ($TiCl_4$), zirconium tetrachloride ($ZrCl_4$), or hafnium tetrachloride ($HfCl_4$). The stable colloidal suspension is achieved by hydrolysis of halides in the solvent, where the solvent can be an alcohol. An example of an alcohol medium serving as the solvent is isopropyl alcohol (IPA). This leaves nanoparticles of refractory metals and/or semi-metals suspended in solution. In some implementations, the solvent is compatible with the resin at a pre-impregnation stage or any densification stage of carbon-carbon composite processing. In some implementations, the colloidal suspension includes a very small amount of carbon-forming resin, which can be followed by a high temperature heat treatment to form gas phase-derived molecular level carbides. The carbon-forming resin can be mixed with the solution of the colloidal suspension at a non-zero weight %. For example, the carbon-forming resin can include a small amount of phenolic resin or other high carbon char yield resin.

The stable colloidal suspension infiltrates the carbon-carbon composite. In some implementations, the stable colloidal suspension specifically infiltrates through the pores of the carbon-carbon composite. The colloidal suspension can infiltrate the carbon-carbon composite having open porosity ranging from about 10% to about 80% or from about 10% to about 50%. The nanoparticles of the colloidal suspension penetrate spaces between fibers, within fiber bundles, and between fiber bundles, thereby providing uniform distribution within the carbon-carbon composite. As used herein, "uniform distribution" can refer to distribution throughout the carbon-carbon composite that is not localized to particular regions or spaces of the carbon-carbon composite. It will be understood that "uniform distribution" does not necessarily suggest a completely even distribution, but that distribution occurs throughout the carbon-carbon composite without limitation and without localization. Infiltration can occur at any step during processing of the carbon-carbon composite, including but not limited to the initial pre-impregnation stage, preform fabrication, carbonization, densification, and CVR silicon carbide formation. This is described further in FIG. 3.

With the nanoparticles dispersed in the carbon-carbon composite, in-situ carbides of the refractory metal and/or semi-metal may be generated by heat treatment. A heat treatment in excess of about 750° C. is performed vaporize the elemental colloidal metal or semi-metal, which reacts with surfaces of the carbon matrix and/or carbon fibers to form carbides. In some implementations, the heat treatment may occur during a given processing stage of carbonization and/or densification, where densification can be liquid-based or chemical vapor infiltration (CVI) carbon densification. In some implementations, the heat treatment can occur at temperatures up to about 3000° C., such as between about 750° C. and about 3000° C. or between about 1000° C. and about 3000° C. In-situ carbides of the refractory metals and/or semi-metals form in spaces between fibers, within fiber bundles, and between fiber bundles, which includes the walls of nanopores and micropores of the carbon-carbon composite. Thus, the in-situ carbides can be provided in both the intrabundle matrix region and interbundle matrix region of a carbon-carbon composite. This kind of distribution of carbides provides molecular level inhibition, where the carbides serve as uniformly distributed molecular inhibitors. With molecular level inhibition, the carbon-carbon composite is internally protected at the nano- and micro-level from oxidation.

In some implementations, the in-situ carbides of refractory metals and/or semi-metals include but are not limited to hafnium carbide (HfC), zirconium carbide (ZrC), titanium carbide (TiC), tantalum carbide (TaC), silicon carbide (SiC), boron carbide ($B_4C$), or combinations thereof. In one example, the in-situ carbides may include a mixture of silicon carbide and hafnium carbide. In another example, the in-situ carbides may include a mixture of silicon carbide and zirconium carbide. It will be understood that the in-situ carbides may include a refractory metal, a semi-metal, or combinations thereof, where the chemistry of in-situ carbides may depend on various factors such as whether the carbon-carbon composite will undergo low temperature applications or high temperature applications. For instance, silicon carbide or boron carbide may be ideal for low temperature applications, while silicon carbide and hafnium carbide or silicon carbide and zirconium carbide may be ideal for high temperature applications. The in-situ carbides may be uniformly distributed throughout the carbon-carbon composite. The in-situ carbides may also be referred to as glass-forming elements or glass-forming inhibitors. The in-situ carbides of refractory metals and/or semi-metals are configured to form glass such as hafnia, zirconia, silicate glass, borate glass, or borosilicate glass upon exposure to oxygen. The glasses serve as barriers to oxidation. The glasses provide uniform internal oxidation protection at the molecular level for effective protection of the carbon-carbon composite.

Figure 1C:
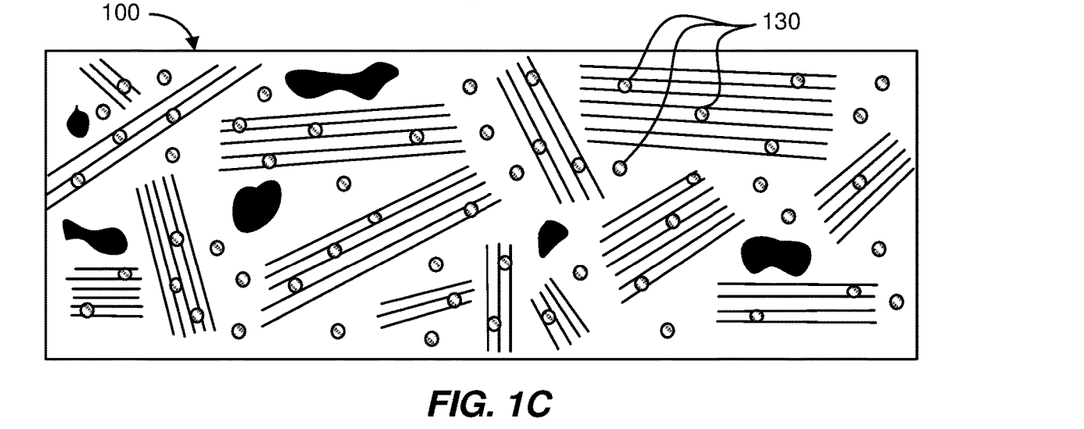
FIG. 1C shows a schematic representation of an example microstructure of a carbon-carbon composite with molecular level inhibition.

FIG. 1C shows a schematic representation of an example microstructure of a carbon-carbon composite with molecular level inhibition. During a pre-impregnation stage, after a first pyrolysis, or after one or more stages of densification, a stable colloidal suspension including nanoparticles of a refractory metal and/or semi-metal is introduced into the carbon-carbon composite 100. The stable colloidal suspension is obtained by hydrolyzing a halide of the refractory metal and/or semi-metal with a solvent such as IPA. The stable colloidal suspension includes nanoparticles each having a diameter equal to or less than about 50 nm suspended in solution without agglomeration.

The carbon-carbon composite 100 is infiltrated with the stable colloidal suspension of nanoparticles of refractory metals and/or semi-metals through the pores 106 of the carbon-carbon composite 100. The carbon-carbon composite 100 is heat treated up to about 3000° C. In some implementations, the heat treatment can occur with a carbon process such as carbonization or densification. For example, the carbon process can include impregnation with phenolic, pitch, CVI carbon, or any other carbonization or densification process known in the art. It will be understood that the heat treatment may occur as part of a conventional process of manufacturing a carbon-carbon composite known in the art. During heat treatment, the nanoparticles of the refractory metals and/or semi-metals react with carbon to form carbides 130 of the refractory metals or semi-metals. For instance, the nanoparticles of the refractory metals and/or semi-metals react with surfaces of the carbon matrix 104 and/or carbon fibers 102 to form carbides 130. The carbides 130 are formed in-situ and are uniformly distributed throughout the carbon-carbon composite 100 to provide molecular level inhibition. The carbides 130 are formed in the intrabundle matrix region 112 and the interbundle matrix region 114 of the carbon matrix 104. This provides internal oxidation protection in spaces between fibers, within fiber bundles, and between fiber bundles. In some implementations, the carbides 130 of the refractory metals and/or semi-metals can include hafnium carbide, zirconium carbide, titanium carbide, tantalum carbide, silicon carbide, boron carbide, or combinations thereof. Each of the carbides 130 is configured to form glass upon oxidation.

Figure 2:
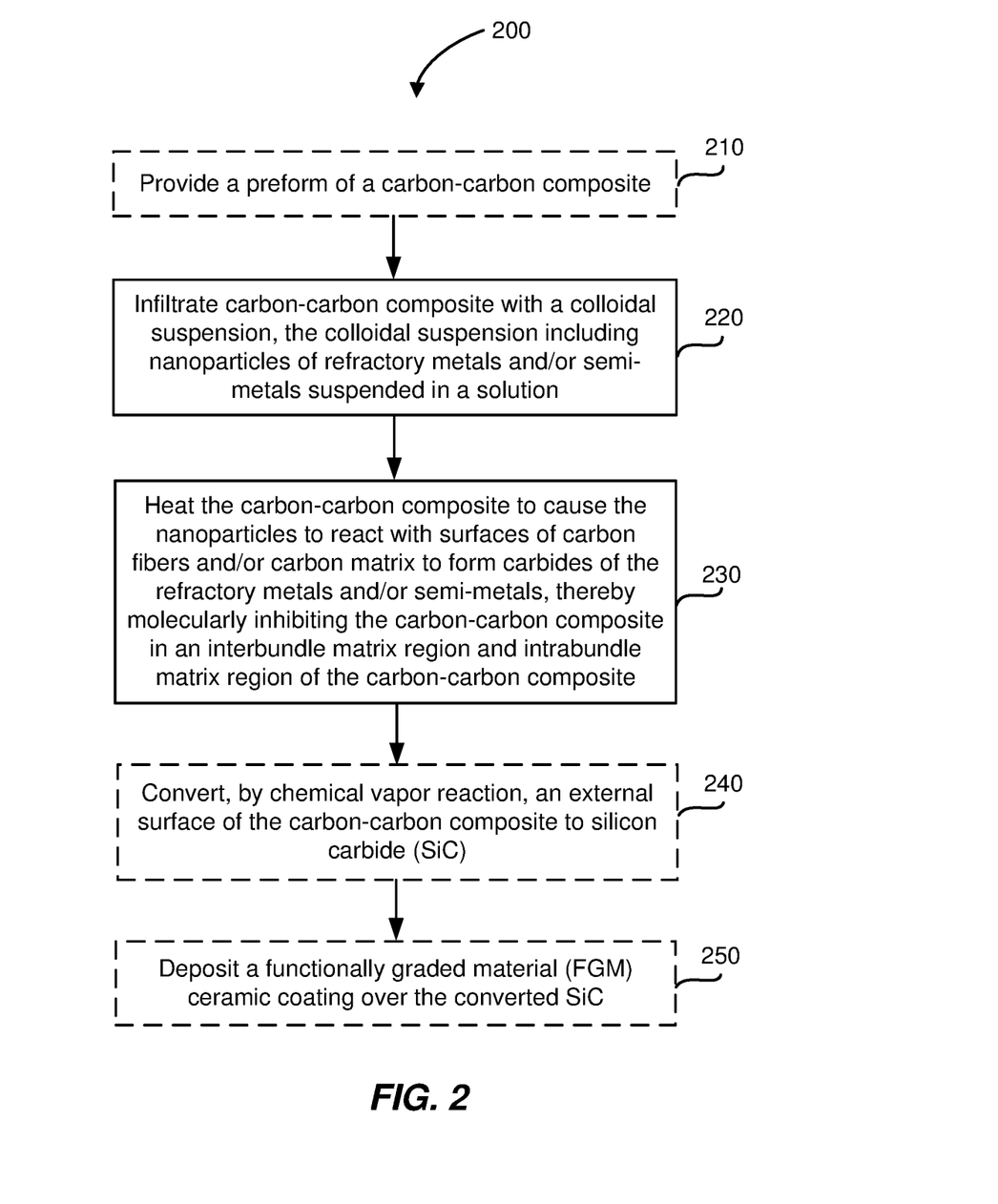
FIG. 2 shows a flow diagram of an example method of protecting a carbon-carbon composite against oxidation according to some implementations.

FIG. 2 shows a flow diagram of an example method of protecting a carbon-carbon composite against oxidation according to some implementations. The operations of a process 200 may be performed in different orders and/or with different, fewer, or additional operations.

At block 210 of the process 200, a preform of a carbon-carbon composite is optionally provided. The preform of the carbon-carbon composite may be 1-D, 2-D, 2.5-D, or 3-D. The preform of the carbon-carbon composite may undergo pre-impregnation. The carbon fibers may be made from pitch, polyacrylonitrile, or rayon-based carbon fiber. Prior to inhibition, the carbon-carbon composite has a density between about 0.4 g/cc and about 2.0 g/cc. In some implementations, the carbon-carbon composite will be carbonized and densified by thermoset, thermoplastic resin, and/or CVI carbon with a heat treatment between about 750° C. and about 3000° C. to form a fully densified carbon-carbon composite.

In some implementations, the carbon fibers may include interfacial fiber coatings. The interfacial fiber coatings serve to protect the carbon fibers from chemical reaction. The interfacial fiber coatings may be deposited on the fibers using various techniques known in the art such as CVD, electroplating, physical vapor deposition (PVD), and liquid precursor coating methods. In some implementations, the interfacial fiber coatings include carbon (C), silicon carbide (SiC), boron nitride (BN), boron carbide ($B_4C$), or titanium carbide (TIC). The interfacial fiber coating is applied to prevent excessive fiber degradation during subsequent high temperature processing.

At block 220 of the process 200, the carbon-carbon composite is infiltrated with a colloidal suspension, where the colloidal suspension includes nanoparticles of refractory metals and/or semi-metals suspended in a solution. In some implementations, prior to infiltration, a stable colloidal suspension is created with the nanoparticles. The colloidal suspension is obtained by hydrolyzing a halide of the refractory metal and/or semi-metal with a solvent. For example, the refractory metal can include titanium, hafnium, or zirconium, and the semi-metal may include silicon or boron. In some implementations, the solvent is an alcohol such as IPA. In some implementations, the halide of refractory metal or semi-metal can include silicon tetrachloride, titanium tetrachloride, zirconium tetrachloride, hafnium tetrachloride, or combinations thereof. In some implementations, the colloidal suspension can include a small amount (non-zero weight %) of a carbon-forming resin such as phenolic resin or other high carbon char yield resin. The colloidal suspension includes nanoparticles each having a diameter equal to or less than about 50 nm suspended in solution without agglomeration and without dissolution. The nanoparticles do not greatly increase viscosity. The process of hydrolysis of halides of refractory metals or semi-metals provides steric stabilization of the colloidal suspension for molecular level penetration. The process of hydrolyzing halides in alcohols such as IPA-type alcohols creates a unique steric stabilization on the molecular level, particularly at 50 nm or below, thereby creating a stable suspension with no agglomeration of nanoparticles. This allows for penetration of not only micro-sized porosity in the interbundle matrix but also nano-sized porosity in the intrabundle matrix. This is ordinarily not done with colloidal suspension of larger particles.

The colloidal suspension may infiltrate the carbon-carbon composite through pores, including micropores and nanopores, of the carbon-carbon composite. The colloidal suspension of nanoparticles is able to infiltrate both interbundle and intrabundle matrix regions of the carbon-carbon composite due at least in part to the small size of the nanoparticles and the low viscosity of the colloidal suspension. In contrast, traditional internal oxidation protection methods employ particulates or powders that are only able to infiltrate within the interbundle matrix of the carbon-carbon composite. Infiltration provides nano-sized metal and/or semi-metal colloids distributed internally and uniformly throughout the carbon-carbon composite. The colloidal suspension may be applied to the carbon-carbon composite for infiltration at the pre-impregnation stage, at a first pyrolysis stage, or during any subsequent densification stage. Such stages are followed by one or more heat treatment operations to form carbides for internal oxidation protection. Infiltration of the colloidal suspension may occur once, twice, or in several repeated infiltration cycles during manufacture of the carbon-carbon composite. In contrast, traditional internal oxidation protection methods introduce particulates or powders usually at just the pre-impregnation stage.

At block 230 of the process 200, the carbon-carbon composite is heated to cause the nanoparticles to react with surfaces of carbon fibers and/or carbon matrix to form carbides of the refractory metals and/or semi-metals, thereby molecularly inhibiting the carbon-carbon composite in an interbundle matrix region and intrabundle matrix region of the carbon-carbon composite. In some implementations, heating the carbon-carbon composite occurs at a temperature between about 750° C. and about 3000° C. Such heat treatment may occur during a process of carbonization or densification. The heat treatment may be simultaneous with a carbon process, where the carbon process may introduce a liquid-based carbon such as thermosetting resin or pitch or introduce a CVI carbon. Thus, the heat treatment may be a conventional part of a process of manufacturing the carbon-carbon composite.

Heating at such high temperatures enables vapor formation of the colloidal nanoparticles of refractory metals and/or semi-metals. The vaporized refractory metals and/or semi-metals react with carbon to create in-situ carbides within both the interbundle matrix region and intrabundle matrix region. The carbides are distributed uniformly throughout the carbon-carbon composite rather than in localized areas of the carbon-carbon matrix. The carbides provide molecular level inhibition rather than particulate level inhibition. Such molecular level inhibition provides carbides formed in-situ in spaces between fibers, within fiber bundles, and between fiber bundles, including in small pores between fiber bundles. Particulate level inhibition provides protection only in spaces between fiber bundles (interbundle matrix region). In some implementations, the carbides can include hafnium carbide, zirconium carbide, titanium carbide, tantalum carbide, silicon carbide, boron carbide, or combinations thereof. During high temperature oxidation, such carbides may form glass such as hafnium-type, zirconium-type, and/or borate-type silicate glass throughout the carbon-carbon composite, thereby protecting open pores of the carbon-carbon composite from oxidation.

Figure 3:
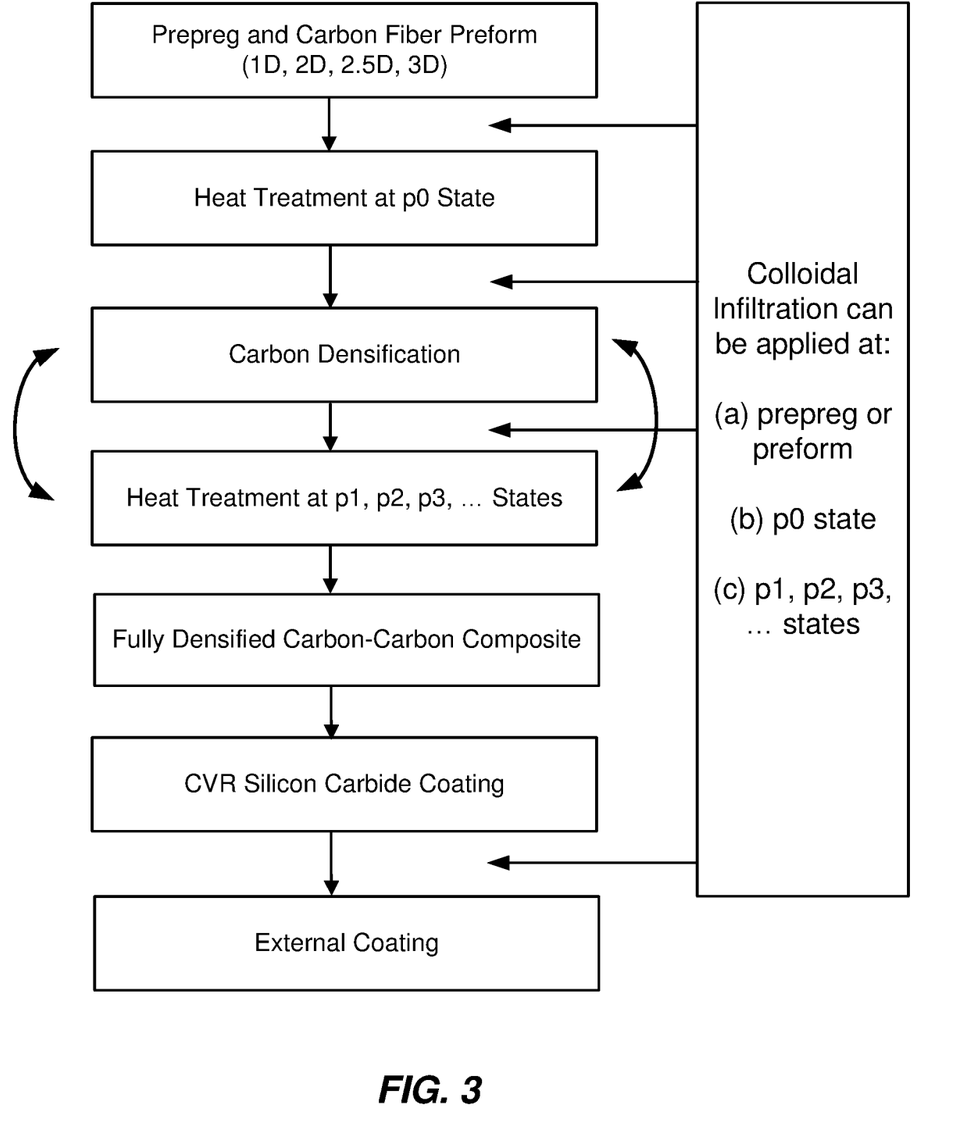
FIG. 3 shows a flow diagram of an example process of manufacturing an oxidation-resistant carbon-carbon composite and stages in which colloidal infiltration can occur in the process.

Operations of colloidal infiltration may occur at various stages during manufacture and densification of the carbon-carbon composite. FIG. 3 shows a flow diagram of an example process of manufacturing an oxidation-resistant carbon-carbon composite and stages in which colloidal infiltration can occur in the process. As shown in FIG. 3, colloidal infiltration can be applied at (a) pre-preg or preform state, (b) p0 state, (c) intermediate densification p1, p2, p3 . . . pn states, and/or (d) post-densification state. The p0 state can represent an initial pyrolysis or carbonization stage prior to densification. For example, open porosity of the carbon-carbon composite may be about 25%. Subsequent intermediate densification stages p1, p2, p3 . . . pn states can represent densification that reduces porosity and increases the density of the carbon-carbon composite by heat treatment. Each of the intermediate densification stages p1, p2, p3 . . . pn includes steps of carbon densification and heat treatment. For example, open porosity of the carbon-carbon composite may be about 20% after p1, about 15% after p2, about 12% after p3, and so forth.

In some implementations, colloidal infiltration can occur at the initial pre-impregnation stage (pre-preg). Heat treatment may occur to form in-situ carbides at the initial pyrolysis stage or p0 state, or heat treatment may occur to form in-situ carbides at any of the intermediate densification stages or p1, p2, p3 . . . pn states. In some implementations, colloidal infiltration can occur at the initial pyrolysis stage or p0 state. This can be in addition or in the alternative to colloidal infiltration at the pre-impregnation stage. Heat treatment may occur to form in-situ carbides at the initial pyrolysis stage or p0 state, or heat treatment may occur to form in-situ carbides at any of the intermediate densification stages or p1, p2, p3 . . . pn states. In some implementations, colloidal infiltration can occur at any of the intermediate densification stages or p1, p2, p3 . . . pn states. This can be in addition or in the alternative to colloidal infiltration at the pre-impregnation stage and/or colloidal infiltration at the initial pyrolysis stage. Heat treatment may occur to form in-situ carbides during the intermediate densification stages or p1, p2, p3 . . . pn states. In short, colloidal infiltration can occur at the pre-impregnation stage or during any subsequent carbonization or densification stage regardless of the porosity of the carbon-carbon composite.

After densification, a colloidal suspension may infiltrate carbon-carbon composite after conversion of an external surface of the carbon-carbon composite to silicon carbide. This may occur in addition or in the alternative to colloidal infiltration that occurs at the pre-impregnation stage or during a carbonization or densification stage. For example, a colloidal suspension of silicon/hafnium may infiltrate over a converted layer of silicon carbide.

Colloidal infiltration may occur once, twice, or multiple times during processing of the carbon-carbon composite and in any of the aforementioned states. In some implementations, heat treatments to form in-situ carbides may occur at the p0 state, p1 state, p2 state, p3 state . . . pn state. In some implementations, heat treatments to form in-situ carbides may occur after conversion of an external surface of the carbon-carbon composite to silicon carbide.

At block 240 of the process 200, an external surface of the carbon-carbon composite is optionally converted to silicon carbide after infiltration and heat treatment. After full densification, a remainder of the carbon matrix near and at the external surface of the carbon-carbon composite is converted to silicon carbide. In some implementations, the silicon carbide is converted from the carbon matrix by chemical vapor reaction (CVR). This forms a layer of protection at the surface of the carbon-carbon composite. Though the CTE mismatch between carbon and silicon carbide may lead to the formation of some thermally induced cracks, the inhibitors of in-situ carbides distributed uniformly throughout the carbon-carbon composite serve to protect against oxidation.

At block 250 of the process 200, a functionally graded material (FGM) ceramic coating is optionally deposited over the converted silicon carbide. The FGM ceramic coating may be deposited using CVD. In some implementations, the FGM ceramic coating includes compositionally graded carbon-silicon carbide (C—SiC). In some implementations, the FGM ceramic coating includes compositionally graded boron nitride-silicon nitride (BN—$Si_3N_4$). In some implementations, the FGM ceramic coating includes compositionally graded boron carbide-silicon carbide ($B_4C$—SiC). The FGM ceramic coating relies on functionally changing material properties including chemistry. The FGM ceramic coating has a thickness equal to or less than about 600 microns. However, the FGM ceramic coating may have a thickness equal to or greater than about 200 microns. Such a thickness provides adequate adhesion and reduces growth stresses. Many FGM ceramic coatings ordinarily have a thickness greater than 600 microns to achieve adequate adhesion.

In some implementations, the FGM ceramic coating of the present disclosure achieves nanoporosity rather than microporosity, and the FGM ceramic coating achieves crystallites and grains that are oriented non-parallel to the substrate surface. Instead of depositing on pure carbon, the FGM ceramic coating is deposited on converted silicon carbide. Furthermore, the first layer of the FGM ceramic coating can include a carbon-rich silicon layer (C-rich SiC).

This enables an increase in delamination resistance and allows growth to be perpendicular and non-parallel to the surface of the substrate. As a result, carbon crystallites and grains as well as different grains are oriented perpendicular (or at least non-parallel) to the surface of the carbon-carbon composite. For example, the carbon crystallites and grains of silicon carbide and/or boron carbide are oriented in a direction non-parallel to the surface of the carbon-carbon composite. Parallel growth patterns may tend to lead to coating spallation at the coating/substrate interface. In addition, nanoporosity may be created between carbon crystallites and grains of silicon carbide and/or boron carbide. Having grains of carbon, silicon carbide, and/or boron carbide oriented perpendicular to the surface of the carbon-carbon composite creates nanoporosity between respective grains. Having grains of carbon, silicon carbide, and/or boron carbide oriented perpendicular to the surface of the carbon-carbon composite prevents or otherwise limits coating spallation. The nano-structural design provides non-equiaxed grain growth as opposed to micro-structural design that provides equiaxed grain growth. This allows for improved thermal shock resistance by creating nano-level crack deflection mechanisms while preventing hot spots on thermal exposure associated with microporosity and microdesign.

In some implementations, the FGM ceramic coating may include a stacking sequence that reduces growth stresses and enables thick FGM ceramic coatings up to about 600 microns. The stacking sequence may include at least a stack composed of: FGM carbon-carbide/carbide I/FGM carbide I-carbide II/carbide II/FGM carbide II-carbide I/carbide I. Carbide I includes but is not limited to silicon carbide and boron carbide. Carbide II includes but is not limited to hafnium carbide, tantalum carbide, titanium carbide, zirconium carbide, and silicon carbide. In some implementations, the stacking sequence may further include or alternatively include FGM carbide-boron nitride, boron nitride, FGM boron nitride-nitride, where nitride can include but is not limited to silicon nitride. The thickness of pure carbide layers or pure nitride layers may be equal to or less than about 75 microns to reduce growth stresses. An example of an FGM ceramic coating with the foregoing stacking sequence is shown in FIG. 4.

Figure 4:
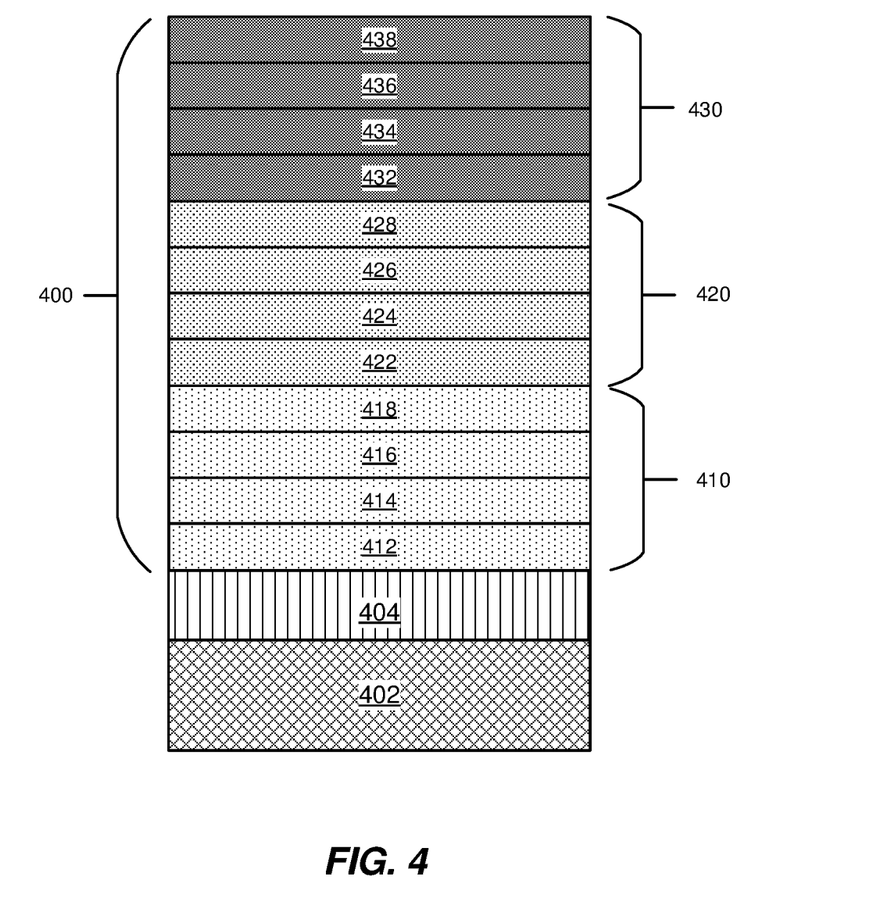
FIG. 4 shows a schematic representation of an example carbon-carbon composite with a functionally graded material (FGM) ceramic external coating.

FIG. 4 shows a schematic representation of an example carbon-carbon composite with an FGM ceramic external coating. A carbon-carbon composite substrate 402 may be molecularly inhibited as described above. A converted layer of silicon carbide 404 may be formed at a surface of the carbon-carbon composite substrate 402. The converted layer of silicon carbide 404 may be formed by CVR. An FGM ceramic external coating 400 includes various stacks 410, 420, and 430. The FGM ceramic external coating 400 addresses intrinsic CTE mismatches between the carbon-carbon composite substrate 402 and outer carbide layers. A first layer 412 of the FGM ceramic external coating 400 includes C—SiC or C—B$_4$C, where the first layer 412 includes about 20 vol. % to about 25 vol. % SiC in carbon matrix rather than pure carbon, or the first layer 412 includes about 20 vol. % to about 25 vol. % B$_4$C in carbon matrix rather than pure carbon. This offers better adhesion to the converted layer of silicon carbide 404. Without being limited by any theory, the chemistry and microstructure of the first layer 412 may serve to minimize coating spallation. In some implementations, subsequent layers to the first layer 412 provide a very thick coating so that the FGM ceramic external coating 400 has a thickness up to about 600 microns with minimum cracking and improved adhesion. It will be understood that the FGM ceramic external coating 400 may have a thickness greater than about 600 microns in some other implementations.

In some implementations, a second layer 414 is deposited on the first layer 412 and includes a carbide I, where carbide I can include silicon carbide or boron carbide. For example, the second layer 414 includes silicon carbide deposited by CVD.

In some implementations, a third layer 416 is deposited on the second layer 414 and includes an FGM carbide I-carbide II, where carbide I may include carbides as listed above and carbide II may include hafnium carbide, tantalum carbide, titanium carbide, zirconium carbide, and silicon carbide. For example, the third layer 416 includes FGM SiC—HfC.

In some implementations, a fourth layer 418 is deposited on the third layer 416 and includes carbide II as listed above. For example, the fourth layer 418 may include hafnium carbide deposited by CVD.

In some implementations, a fifth layer 422 is deposited on the fourth layer 418 and includes an FGM carbide II-carbide I, where carbide II is listed above and carbide I is listed above. For example, the fifth layer 422 may include FGM HfC—SiC.

In some implementations, a sixth layer 424 is deposited on the fifth layer 422 and includes a carbide I as listed above. For example, the sixth layer 424 may include silicon carbide deposited by CVD.

In some implementations, a seventh layer 426 is deposited on the sixth layer 424 and includes an FGM carbide I-carbide II, where carbide I may include carbides as listed above and carbide II may include carbides as listed above. For example, the seventh layer 426 includes FGM SiC—HfC.

In some implementations, an eighth layer 428 is deposited on the seventh layer 426 and includes carbide II as listed above. For example, the eighth layer 428 may include hafnium carbide deposited by CVD.

In some implementations, a ninth layer 432 is deposited on the eighth layer 428 and includes an FGM carbide II-carbide I, where carbide II is listed above and carbide I is listed above. For example, the ninth layer 432 may include FGM HfC—SiC.

In some implementations, a tenth layer 434 is deposited on the ninth layer 432 and includes a carbide I as listed above. For example, the tenth layer 434 may include silicon carbide deposited by CVD.

In some implementations, an eleventh layer 436 is deposited on the tenth layer 434 and includes an FGM carbide I-carbide II, where carbide I may include carbides as listed above and carbide II may include carbides as listed above. For example, the eleventh layer 436 includes FGM SiC—HfC.

In some implementations, a twelfth layer 438 is deposited on the eleventh layer 436 and includes carbide II as listed above. For example, the twelfth layer 438 may include hafnium carbide deposited by CVD.

It will be understood that the stacking sequence may continue to repeat to achieve a desired result. In some implementations, each of the pure carbide layers, such as layers 414, 418, 424, 428, 434, and 438, may have a thickness equal to or less than about 75 microns to reduce growth stresses. Each of the FGM carbide layers, such as layers 412, 416, 422, 426, 432, and 436 are compositionally graded and functionally graded carbides. Without being limited by any theory, the chemistry and microstructure of the FGM carbide layers, particularly the FGM carbide I-carbide II layers, may serve to minimize coating spallation, minimize growth cracks, and enable thick coating formation.

The arrangement of layers in the stacking sequence provides excellent adhesion, excellent thermal shock resistance, and excellent erosion resistance.

In some implementations, the FGM ceramic external coating 400 may serve to protect the carbon-carbon composite substrate 402 against oxidation in multi-cycle applications without internal inhibition. In some other implementations, the FGM ceramic external coating 400 may serve to protect the carbon-carbon composite substrate 402 against oxidation in multi-cycle applications with internal inhibition as described above.

In addition or in the alternative to an FGM ceramic external coating as described in FIG. 4, a metallic coating is optionally deposited on the converted silicon carbide. The metallic coating may include a metal such as iridium, rhenium, or platinum. As discussed earlier, iridium serves as an excellent barrier to oxygen. Iridium also has a very high melting point (i.e., about 4436° F.). However, iridium is susceptible to oxidation.

Figure 5:
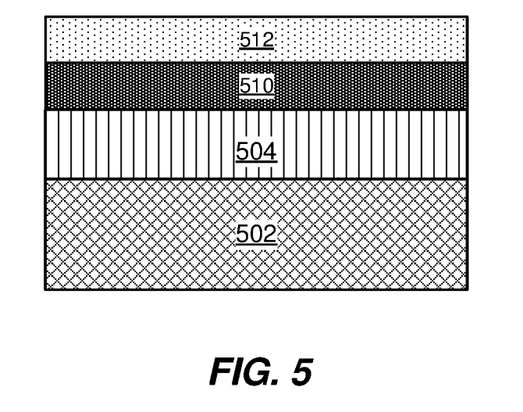
FIG. 5 shows a schematic representation of an example carbon-carbon composite with an FGM ceramic external coating on a metallic coating.

FIG. 5 shows a schematic representation of an example carbon-carbon composite with an FGM ceramic external coating on a metallic coating. A carbon-carbon composite substrate 502 may be molecularly inhibited as described above. A converted layer of silicon carbide 504 may be formed at a surface of the carbon-carbon composite substrate 502. The converted layer of silicon carbide 504 may be formed by CVR. A metallic coating 510 may be deposited on the converted layer of silicon carbide 504. The metallic coating 510 may include iridium, rhenium, or platinum. In some implementations, the metallic coating 510 is deposited by CVD. To protect the metallic coating 510, an FGM ceramic external coating 512 is deposited over the metallic coating 510. The FGM ceramic external coating 512 may include an FGM silicon-refractory metal such as an FGM Si—Hf. In other words, the FGM ceramic external coating 512 includes a compositionally graded layer between silicon and a refractory metal. In some implementations, the top layer of the FGM ceramic external coating 512 is the refractory metal. The FGM ceramic external coating 512 may be applied on the metallic coating 510 to reduce coating spallation and oxidation. Without being limited by any theory, a hafnium-silicate glass or other refractory silicate glass will be formed to provide low oxygen permeability and high viscosity for protecting the metallic coating 510.

In addition or in the alternative to an FGM ceramic external coating as described in FIG. 4, a polymer-based coating is optionally deposited on the converted silicon carbide. The polymer-based coating may employ ceramic-based polymeric binders with different carbide powders. Examples of different carbide powders may include silicon carbide and hafnium carbide. Discrete layers are stacked over one another to simulate a compositional gradient by functionally changing coating chemistry. In some implementations, each of the discrete layers may be spray coated.

Figure 6:
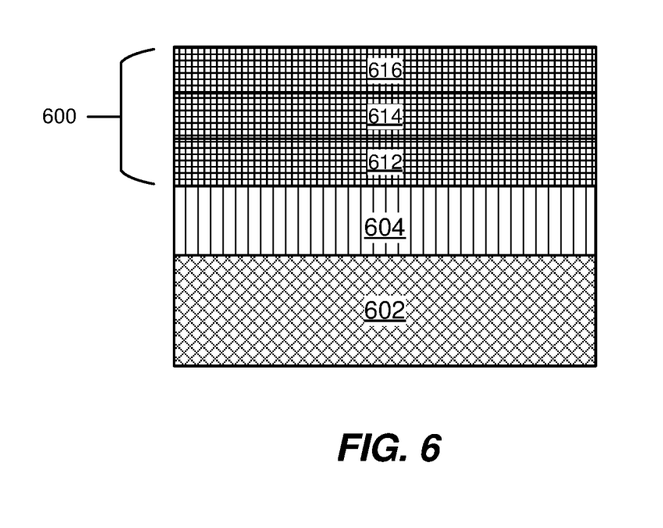
FIG. 6 shows a schematic representation of an example carbon-carbon composite with a polymer-based coating.

FIG. 6 shows a schematic representation of an example carbon-carbon composite with a polymer-based coating. A carbon-carbon composite substrate 602 may be molecularly inhibited as described above. A converted layer of silicon carbide 604 may be formed at a surface of the carbon-carbon composite substrate 602. The converted layer of silicon carbide 604 may be formed by CVR. A polymer-based coating 600 may be deposited on the converted layer of silicon carbide 604. The polymer-based coating 600 may include multiple discrete layers 612, 614, and 616. In some implementations, each of the discrete layers 612, 614, and 616 may be equal to or less than about 25 microns. In some implementations, each of the discrete layers 612, 614, and 616 may be spray coated or painted. In some implementations, each discrete layer 612, 614, and 616 may be cured and pyrolyzed at temperatures up to about 1200° C.

Each of the discrete layers 612, 614, and 616 may include filled polymers or polymer-impregnated with a polymeric binder. Each of the discrete layers 612, 614, and 616 may be filled with one or more particulates of a refractory metal or semi-metal powder. In some implementations, the refractory metal may include hafnium and the semi-metal may include silicon. In some implementations, a first layer 612 includes a binder that is a pre-ceramic polymeric binder mixed with powders of silicon carbide, where an average size of the powders of silicon carbide is between about 100 nm and about 6 microns. Thus, the first layer 612 is a silicon-rich polymer layer. In some implementations, a second layer 614 includes refractory metal or carbide powder added to the mixture of silicon carbide with pre-ceramic polymeric binder. For example, the refractory metal includes hafnium, where an average size of the refractory metal powder is between about 100 nm and about 6 microns. In some implementations, a third layer 616 includes a binder that is a pre-ceramic polymeric binder mixed with powders of refractory metal, where an average size of the powders of refractory metal is between about 100 nm and about 6 microns. For example, the refractory metal includes hafnium. Thus, the third layer 616 can be a hafnium-rich polymer layer or other refractory metal-rich polymer layer.

In addition to the FGM ceramic external coating described in FIGS. 4 and 5 or the polymer-based coating described in FIG. 6, a polymer sealant is optionally deposited. The polymer sealant may be an as-cured polymer sealant or other low-temperature heat-treated sealant. In some implementations, the sealant may be formed by mixing pre-ceramic polymeric binder with silicon carbide and refractory metal or carbide powders. In some implementations, the pre-ceramic polymeric binder may include tetra-ethyl-orthosilicate (TEOS) or other TEOS-based materials.

Figure 7:
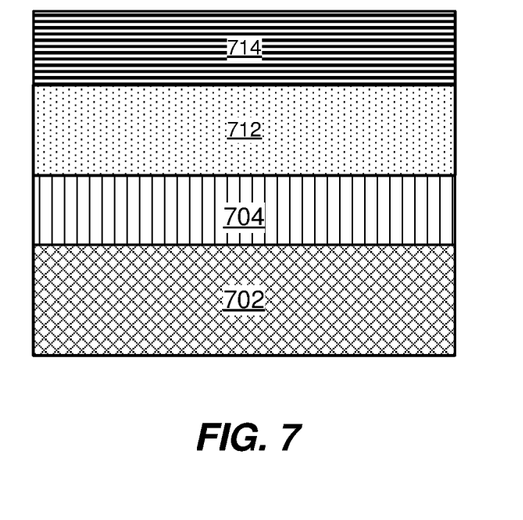
FIG. 7 shows a schematic representation of an example carbon-carbon composite with an as-cured polymer sealant.

FIG. 7 shows a schematic representation of an example carbon-carbon composite with an as-cured polymer sealant. A carbon-carbon composite substrate 702 may be molecularly inhibited as described above. A converted layer of silicon carbide 704 may be formed at a surface of the carbon-carbon composite substrate 702. The converted layer of silicon carbide 704 may be formed by CVR. An intermediate layer 712 may be deposited on the converted layer of silicon carbide 704, where the intermediate layer 712 may include an FGM ceramic external coating as described in FIGS. 4 and 5 or a polymer-based coating as described in FIG. 6. A polymer sealant 714 is deposited over the intermediate layer 712. The intermediate layer 712 may have silicon or other non-carbon chemistry polymer by itself or with particulates. Particulate sizes may vary from about 100 nm to about 6 microns. The polymer sealant 714 may be an as-cured polymer sealant or low-temperature heat-treated sealant enables glass penetration (e.g., in-situ silicon dioxide) into any coating defects during exposure to low temperature service testing. The polymer sealant 714 may result in a glassy phase rather than a crystalline phase that forms in various cracks or crystal defects of underlying coatings. In curing the polymer sealant 714 in some implementations, various external sources of heat may be applied.

It will be understood that the present disclosure may include any one or a combination of the coatings or surfaces on a carbon-carbon composite described in FIGS. 4-7. Specifically, the carbon-carbon composite of the present disclosure may have a converted layer of silicon carbide, FGM ceramic external coating (FIG. 4), metallic coating (FIG. 5), polymer-based coating (FIG. 6), as-cured polymer sealant (FIG. 7), or any combination thereof. The carbon-carbon composite may be molecularly inhibited as described above, or the carbon-carbon composite may be protected by another internal oxidation protection system described above. The carbon-carbon composite of the present disclosure may withstand an elevated temperature in a temperature range of 2000° F. to 4200° F. without mass loss exceeding more than 1%.

EXAMPLES

Example 1: A carbon-carbon composite was made with a T-300 8HS fabric and phenolic derived resin combined with 2800° C. heat treatment. The composite density was initially 1.55 g/cc with 32% open porosity. The carbon-carbon composite was infiltrated six times with colloidal Hf suspension attained by hydrolyzing $HfCl_4$ with IPA. Subsequently, phenolic resin densification was performed followed by 2800° C. heat treatment. About 50-micron surface conversion into SiC by SiO reaction was achieved. Subsequently, eight layers of pre-ceramic Si coatings were applied. First layer had 20 wt. % of HfC, and last layer had 85 wt. % of HfC. The intermediate layers had wt. % of HfC varying from 20 wt. % to 85 wt. %. A polymer-based coating was pyrolyzed to 900° C. in inert atmosphere. The oxidation-resistant carbon-carbon composite was torched-tested at 4000° F. in ten cycles, with a 5-minute duration for each cycle. Afterwards, only 0.2 wt. % mass loss was measured.

Example 2: A carbon-carbon substrate as described above. A coating application was used to apply 50-micron thick metallic coating of iridium by CVD. Subsequently 80 wt. % Hf coating as described above was applied and cured only. The oxidation-resistant carbon-carbon composite was torch-tested as discussed in Example 1 but no mass loss was observed. Instead, only 0.5 wt. % gain was measured.

Example 3: A carbon-carbon composite was made with a T-300 8HS fabric and phenolic derived resin combined with 2800° C. heat treatment. The composite density was initially 1.55 g/cc with 32% open porosity. The carbon-carbon composite was infiltrated six times with colloidal Hf suspension attained by hydrolyzing $HfCl_4$ with IPA. Subsequently, phenolic resin densification was performed followed by 2800° C. heat treatment. About 50-micron surface conversion into SiC by SiO reaction was achieved. Subsequently, compositionally graded layers were deposited by CVD, including 50-micron thick FGM C—SiC (15% Si in first C/SiC layer), 20-micron thick SiC, 60-micron thick FGM SiC—HfC, and 20-micron thick HfC. After torch-testing as described in Example 1, only 0.05% mass loss was measured.

Example 4: A carbon-carbon composite was made with stretch broken fabrics (2-5D carbon preform) and phenolic derived resin combined with 2800° C. heat treatment. The composite density was initially 1.30 g/cc with 45% open porosity. The carbon-carbon composite was infiltrated six times with colloidal Hf suspension attained by hydrolyzing $HfCl_4$ with IPA. Subsequently, phenolic resin densification was performed followed by 2800° C. heat treatment. About 50-micron surface conversion into SiC by SiO reaction was achieved. Subsequently, eight layers of pre-ceramic Si coatings were applied. First layer had 20 wt. % of HfC, and last layer had 85 wt. % of HfC. The intermediate layers had wt. % of HfC varying from 20 wt. % to 85 wt. %. A polymer-based coating was pyrolyzed to 900° C. in inert atmosphere. The oxidation-resistant carbon-carbon composite was torched-tested at 4000° F. in ten cycles, with a 5-minute duration for each cycle. Afterwards, only 0.02 wt. % mass loss was measured.

CONCLUSION

Although the foregoing disclosed systems, methods, apparatuses, processes, and compositions have been described in detail within the context of specific implementations for the purpose of promoting clarity and understanding, it will be apparent to one of ordinary skill in the art that there are many alternative ways of implementing foregoing implementations which are within the spirit and scope of this disclosure. Accordingly, the implementations described herein are to be viewed as illustrative of the disclosed inventive concepts rather than restrictively, and are not to be used as an impermissible basis for unduly limiting the scope of any claims eventually directed to the subject matter of this disclosure.

What is claimed is:

1. A carbon-carbon composite, comprising:
   a carbon matrix;
   tows of carbon fibers disposed in the carbon matrix; and
   in-situ carbides disposed in the carbon matrix,
   wherein the in-situ carbides are selected from in-situ carbides of refractory metals, semi-metals, or a combination thereof,
   wherein each tow comprises carbon fibers bundled or woven together and having an elastic modulus correlating to a degree of alignment of the carbon fibers in the tow,
   wherein the carbon matrix has an intrabundle matrix region and an interbundle matrix region, wherein the intrabundle matrix region is spaces within a tow of the carbon fibers, and wherein the interbundle matrix region is spaces that separate tows of the carbon fibers, and
   wherein the in-situ carbides are:
   (i) distributed uniformly throughout the carbon matrix in both the intrabundle matrix region and the interbundle matrix region; and
   (ii) configured to form glass upon oxidation such that oxidation of the carbon matrix is inhibited at a molecular level by the oxidation of the in-situ carbides distributed uniformly throughout the carbon matrix in both the intrabundle matrix region and the interbundle matrix region.

2. The carbon-carbon composite of claim 1, wherein the in-situ carbides comprise hafnium carbide, zirconium carbide, titanium carbide, tantalum carbide, silicon carbide, boron carbide, or combinations thereof.

3. The carbon-carbon composite of claim 1, wherein the carbon-carbon composite is configured to withstand the temperature range of 2000° F. to 4200° F. without mass loss exceeding more than 1%.

4. The carbon-carbon composite of claim 1, wherein the in-situ carbides are formed from: (i) infiltrating pores of the carbon-carbon composite with a colloidal suspension, the colloidal suspension including nanoparticles of refractory metals or semi-metals suspended in a solution, and (ii) heating the carbon-carbon composite to cause the nanoparticles to react with surfaces of the carbon fibers and/or carbon matrix to form the in-situ carbides.

5. The carbon-carbon composite of claim 4, wherein the nanoparticles each have a diameter equal to or less than about 50 nm.

6. The carbon-carbon composite of claim 4, wherein the colloidal suspension is formed from mixing isopropyl alcohol (IPA) with hydrolyzed halides of the refractory metals and/or semi-metals.

7. The carbon-carbon composite of claim 4, wherein heating the carbon-carbon composite occurs at a temperature between about 750° C. and about 3000° C.

8. The carbon-carbon composite of claim 4, wherein infiltrating the pores of the carbon-carbon composite with the colloidal suspension occurs at an initial pre-impregnation stage and/or at a carbon densification stage.

9. The carbon-carbon composite of claim 4, wherein the carbon-carbon composite has a density between 0.4 g/cc and 2.0 g/cc prior to infiltrating the pores of the carbon-carbon composite with the colloidal suspension.

10. The carbon-carbon composite of claim 1, wherein the carbon fibers are made from pitch or polyacrylonitrile (PAN) fibers, the carbon fibers arranged in a 1-D fiber preform, 2-D fiber preform, 2.5-D fiber preform, or 3-D fiber preform.

11. The carbon-carbon composite of claim 1, further comprising:
a layer of silicon carbide (SiC), wherein the layer of SiC is converted by chemical vapor reaction (CVR) at an external surface of the carbon-carbon composite.

12. The carbon-carbon composite of claim 11, further comprising:
an external coating comprising a functionally graded material (FGM) ceramic coating over the layer of SiC, the FGM ceramic coating including compositionally graded C—SiC, BN—$Si_3N_4$, or $B_4C$—SiC, the FGM ceramic coating having a thickness equal to or less than about 600 microns.

13. The carbon-carbon composite of claim 12, wherein the FGM ceramic coating includes at least a stack composed of FGM C-carbide I/carbide I/FGM carbide I-carbide II/carbide II/FGM carbide II-carbide I/carbide I, wherein carbide I is selected from a group consisting of: silicon carbide and boron carbide, and wherein carbide II is selected from a group consisting of: hafnium carbide, tantalum carbide, titanium carbide, zirconium carbide, and silicon carbide.

14. The carbon-carbon composite of claim 11, further comprising:
a metallic coating over the layer of SiC; and
an FGM ceramic coating over the metallic coating.

15. The carbon-carbon composite of claim 11, further comprising:
a polymer-based coating over the layer of SiC, wherein the polymer-based coating includes a plurality of polymer-impregnated layers each having one or more particulates of a refractory metal or semi-metal powder.

16. The carbon-carbon composite of claim 11, further comprising:
an FGM ceramic coating over the layer of SiC; and
an as-cured polymer sealant or low-temperature heat-treated sealant over the FGM ceramic coating.

17. The carbon-carbon composite of claim 1, further comprising:
one or more interfacial fiber coatings on the carbon fibers, the one or more interfacial fiber coatings comprising carbon (C), boron nitride (BN), silicon carbide (SiC), or combinations thereof.

* * * * *